United States Patent
Drummey et al.

(10) Patent No.: US 11,421,114 B2
(45) Date of Patent: *Aug. 23, 2022

(54) PRECURSORS FOR FORMING HETEROPHASIC ANTI-FOULING POLYMERIC COATINGS

(71) Applicant: GM GLOBAL TECHNOLOGY OPERATIONS LLC, Detroit, MI (US)

(72) Inventors: Kevin J. Drummey, Los Angeles, CA (US); Adam F. Gross, Santa Monica, CA (US); Ashley M. Dustin, Los Angeles, CA (US); Anthony L. Smith, Troy, MI (US); April R. Rodriguez, Los Angeles, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/775,904

(22) Filed: Jan. 29, 2020

(65) Prior Publication Data
US 2021/0230433 A1   Jul. 29, 2021

(51) Int. Cl.
  *C09D 5/16* (2006.01)
  *C09D 101/02* (2006.01)
  *C09D 127/12* (2006.01)

(52) U.S. Cl.
  CPC ......... *C09D 5/1662* (2013.01); *C09D 101/02* (2013.01); *C09D 127/12* (2013.01)

(58) Field of Classification Search
  CPC ... C09D 4/00; C09D 4/06; C09D 5/00; C09D 5/02; C09D 5/021; C09D 5/022; C09D 5/024; C09D 5/025; C09D 5/08; C09D 5/082; C09D 5/084; C09D 5/086; C09D 5/088; C09D 5/14; C09D 5/16; C09D 5/1606; C09D 5/1612; C09D 5/1618; C09D 5/1625; C09D 5/1631; C09D 5/1637; C09D 5/1643; C09D 5/165; C09D 5/1656; C09D 5/1662; C09D 5/1668; C09D 5/1675; C09D 5/1681; C09D 5/1687; C09D 5/1863; C09D 7/66; C09D 7/67; C09D 7/68; C09D 7/69; C09D 127/12; C09D 127/14; C09D 127/16; C09D 127/18; C09D 127/20; B05D 7/24; B05D 5/00
  See application file for complete search history.

(56) References Cited

U.S. PATENT DOCUMENTS

| | | |
|---|---|---|
| 3,272,890 A | 9/1966 | O'Leary, Jr. et al. |
| 3,358,052 A | 12/1967 | Archer, Jr. et al. |
| 4,179,479 A | 12/1979 | Carter, Jr. |
| 4,376,654 A | 3/1983 | Zola |
| 4,581,412 A | 4/1986 | Ohmori et al. |
| 4,667,000 A | 5/1987 | Ohmor et al. |
| 4,855,164 A | 8/1989 | Burkholder et al. |
| 5,028,648 A | 7/1991 | Famili et al. |
| 5,055,525 A | 10/1991 | Henton et al. |
| 5,371,143 A | 12/1994 | Novak et al. |
| 5,536,539 A | 7/1996 | Ellison et al. |
| 5,549,948 A | 8/1996 | Blong et al. |
| 5,898,046 A | 4/1999 | Raiford et al. |
| 5,919,851 A | 7/1999 | Yamaguchi et al. |
| 6,005,031 A | 12/1999 | Bremer-Masseus et al. |
| 6,071,564 A | 6/2000 | Marchetti et al. |
| 6,127,486 A | 10/2000 | Burger et al. |
| 6,576,706 B1 | 6/2003 | Nodera et al. |
| 6,740,357 B2 | 5/2004 | Yamaguchi et al. |
| 6,992,132 B2 | 1/2006 | Trombetta et al. |
| 7,361,708 B2 | 4/2008 | Tomihashi et al. |
| 7,557,154 B2 | 7/2009 | Agarwal et al. |
| 7,807,752 B2 | 10/2010 | Masutani et al. |

(Continued)

FOREIGN PATENT DOCUMENTS

| CN | 1284970 A | 2/2001 |
|---|---|---|
| CN | 1742064 A | 3/2006 |

(Continued)

OTHER PUBLICATIONS

First Office Action for Chinese Patent Application No. 201910504011.6 dated Feb. 25, 2021 with correspondence dated Mar. 1, 2021 from China Patent Agent (H.K.) Ltd summarizing content, 11 pages.

First Office Action for German Patent Application No. 10 2020 134 464.3, dated Jun. 15, 2021 with correspondence dated Jul. 13, 2021 from Manitz Finsterwald summarizing content, 8 pages.

First Office Action for German Patent Application No. 102019115461. 8, dated Apr. 8, 2021 with correspondence dated Apr. 22, 2021 from Manitz Finsterwald summarizing content, 7 pages.

(Continued)

*Primary Examiner* — Christopher M Rodd

(74) *Attorney, Agent, or Firm* — Harness, Dickey & Pierce, P.L.C.

(57) ABSTRACT

An aqueous precursor liquid for forming an anti-fouling heterophasic thermoset polymeric coating is provided. The precursor liquid includes a first fluorine-containing polyol precursor having a functionality >about 2 that forms a fluorine-containing polymer component defining a first phase in the coating. The precursor liquid also includes a second precursor that forms a second component present as a second phase. The first phase can be a continuous phase and the second phase can be a discrete phase, or the second phase can be the continuous phase and the first phase can be the discrete phase. The discrete phase includes a plurality of domains each having an average size of ≥to about 500 nm to ≤to about 25,000 nm. A crosslinking agent, water, and optional acid or base are also present. Methods of making anti-fouling heterophasic thermoset polymeric coatings with such precursors are also provided.

20 Claims, 4 Drawing Sheets

(56) References Cited

U.S. PATENT DOCUMENTS

| | | |
|---|---|---|
| 8,710,142 B2 | 4/2014 | Chida et al. |
| 10,125,227 B2 | 11/2018 | Gross et al. |
| 10,240,065 B2 | 3/2019 | Nowak et al. |
| 10,259,971 B2 | 4/2019 | Nowak et al. |
| 10,344,244 B2 | 7/2019 | Gross et al. |
| 10,400,136 B2 | 9/2019 | Dustin et al. |
| 10,442,935 B2 | 10/2019 | Nelson et al. |
| 10,570,292 B1 | 2/2020 | Rodriguez et al. |
| 10,619,057 B2 | 4/2020 | Nowak et al. |
| 10,689,542 B2 | 6/2020 | Dustin et al. |
| 2002/0013385 A1 | 1/2002 | Simendinger |
| 2003/0027927 A1 | 2/2003 | White et al. |
| 2006/0142455 A1 | 6/2006 | Agarwal et al. |
| 2008/0015298 A1 | 1/2008 | Xiong et al. |
| 2010/0063197 A1 | 3/2010 | Collier et al. |
| 2014/0162022 A1 | 6/2014 | Nowak et al. |
| 2016/0009971 A1 | 1/2016 | Wang et al. |
| 2016/0194574 A1 | 7/2016 | Gross et al. |
| 2016/0201005 A1 | 7/2016 | Nowak et al. |
| 2016/0254141 A1 | 9/2016 | Hustad et al. |
| 2017/0009000 A1 | 1/2017 | Hendershot et al. |
| 2017/0015848 A1 | 1/2017 | Aruga |
| 2017/0015922 A1 | 1/2017 | Gross et al. |
| 2017/0174910 A1 | 6/2017 | Nowak et al. |
| 2017/0174911 A1 | 6/2017 | Nowak et al. |
| 2017/0267871 A1 | 9/2017 | Nowak et al. |
| 2017/0298286 A1 | 10/2017 | Nowak et al. |
| 2018/0030329 A1 | 2/2018 | Nowak et al. |
| 2018/0037746 A1 | 2/2018 | Nelson et al. |
| 2018/0104182 A1 | 4/2018 | Kiser et al. |
| 2018/0208795 A1* | 7/2018 | Dustin .............. C08G 18/5015 |
| 2019/0048223 A1 | 2/2019 | Dustin et al. |
| 2019/0125028 A1 | 5/2019 | Bartel et al. |
| 2019/0142317 A1 | 5/2019 | Steedman et al. |
| 2019/0302316 A1 | 10/2019 | Gross et al. |
| 2019/0382578 A1 | 12/2019 | Rodriguez et al. |
| 2020/0073019 A1 | 3/2020 | Hart et al. |
| 2020/0109294 A1 | 4/2020 | Rodriguez et al. |
| 2020/0123409 A1 | 4/2020 | Shigeno |
| 2020/0148896 A1 | 5/2020 | Rodriguez et al. |
| 2020/0369002 A1 | 11/2020 | Gross et al. |

FOREIGN PATENT DOCUMENTS

| | | |
|---|---|---|
| CN | 1878809 A | 12/2006 |
| CN | 105683306 A | 6/2016 |
| CN | 108602983 A | 9/2018 |
| CN | 108699203 A | 10/2018 |
| CN | 109476947 A | 3/2019 |
| CN | 110191932 A | 8/2019 |
| CN | 110615982 A | 12/2019 |
| CN | 110799619 A | 2/2020 |
| CN | 111019450 A | 4/2020 |
| CN | 111019498 A | 4/2020 |
| CN | 111032802 A | 4/2020 |
| CN | 113265168 A | 8/2021 |
| DE | 102019114612 A1 | 12/2019 |
| DE | 102019115261 A1 | 4/2020 |
| DE | 102019115461 A1 | 4/2020 |
| DE | 102020134464 A1 | 7/2021 |
| JP | 2014072434 A | 4/2014 |
| WO | 2016118464 A2 | 7/2016 |
| WO | 2017117157 A1 | 7/2017 |
| WO | 2018140212 A1 | 8/2018 |
| WO | 2019005272 A1 | 1/2019 |

OTHER PUBLICATIONS

Rodriguez, April R. et al., U.S. Appl. No. 16/155,341, filed Oct. 9, 2018 entitled "Heterophasic Anti-Fouling, Solvent-Borne Polymeric Coating Having a Fluorinated Continuous Phase With Non-Fluorinated Domains," 55 pages.

Rodriguez, April R. et al., U.S. Appl. No. 16/155,347, filed Oct. 9, 2018 entitled "Water-Borne Precursors for Forming Heterophasic Anti-Fouling, Polymeric Coatings Having a Fluorinated Continuous Phase With Non-Fluorinated Domains," 59 pages.

Akhmatskaya, E. et al, "Dynamic modeling of the morpholoy of multiphase waterborne polymer particles" Colloid and Polymer Science 2013, 291 (1), 87-98.

Althues, H. et al., "Functional inorganic nanofillers for transparent polymers," Chem. Soc. Rev. (2007) 36, pp. 1454-1465; (Published Apr. 17, 2007) DOI: 10.1039/b608177k.

Anonymous, "Anti-icing Coated Ultrasonic Sensors," Research Disclosure (Aug. 16, 2017), 2 pages.

Anonymous, Evo® Protect ESA. Technical Datasheet. Dystar L.P., 2015, 2 pages.

Anonymous, "Fluoro coating, weather resistant coating (Varnish): ZEFFLE™ GK Series." Datasheet, Ver. 03 [online]. Daikin Industries Ltd., Nov. 2013 [retrieved on Sep. 11, 2018]. Retrieved from the Internet: <URL: https://www.daikin.com/chm/products/pdfDown.php?url=pdf/tds/tds_gk-1_j_Ver03_E.pdf>.

Chevalier, Y. et al., "Structure of Waterborne Organic Composite Coatings" Macromolecules 1999, 32 (23), 7887-7896.

Del Amo, B. et al., "High performance water-based paints with non-toxic anticorrosive pigments" Progress in Organic Coatings 2002, 45 (4), 389-397.

Goikoetxea, M. et al, "Polymerization Kinetics and Microstructure of Waterborne Acrylic/Alkyd Nanocomposites Synthesized by Miniemulsion" Journal of Polymer Science Part A: Polymer Chemistry 2009, 47 (19), 4871-4885.

Gross, Adam F. et al., "Construction of an Insect Impact Testing System and Data from Low Adhesion Polymer Coatings" 2016 Adhesion Society Annual Meeting Proceedings, Feb. 22, 2016; 3 pages.

Gross, Adam F. et al., "Insect Abatement on Lubricious, Low Adhesion Polymer Coatings Measured with an Insect Impact Testing System." Adv Polym Sci. (Dec. 2017). 17 pages. DOI: 10.1007/12_2017_35.

Kawahara, H. et al., "Preparation of Epoxy Resin/Acrylic Composite Latexes by Miniemulsion Polymerization Method" Journal of Applied Polymer Science 2001, 81 (1), 128-133.

Overbeek, A., "Polymer heterogeneity in waterborne coatings," J. Coat. Technol. Res, 7 (1) (2010), pp. 1-21; DOI: 101007/S11998-009-9201-5.

Stubbs, J. M. et al., "Core-shell and other multiphase latex particles-confirming their morphologies and relating those to synthesis variables," J. Coat. Technol. Res., 5 (2) (2008), pp. 169-180; DOI: 10.1007/a11998-007-9060-x.

Tielemans, M. et al., "Multiphase coatings from complex radiation curable polyurethane dispersions" Progress in Organic Coatings 2012, 75 (4), 560-568.

First Office Action for Chinese Patent Application No. 202110126269.4 dated Dec. 9, 2021, with correspondence dated Dec. 29, 2021, from China Patent Agent (H.K.) Ltd summarizing content, 13 pages.

* cited by examiner

PRECURSORS FOR FORMING HETEROPHASIC ANTI-FOULING POLYMERIC COATINGS

INTRODUCTION

This section provides background information related to the present disclosure which is not necessarily prior art.

The present disclosure relates generally to a heterophasic thermoset polymeric coating derived from a water-borne mixture (e.g., suspension or solution) and more specifically to a water-borne precursor that can be used to treat an article to form a heterophasic thermoset polymer coating that includes a first phase having a first fluorine-containing polymer component and a second phase comprising a second component.

Surfaces of various materials, such as plastics, metals, sensors, fabrics, leather, and glass, can become soiled from debris (e.g., particles, oils, dust, insects), especially in automotive applications. The debris can affect not only aesthetics of surfaces, but also performance where the surfaces are functional. For example, if the material is a plastic or metal component present on the exterior of an automobile, the presence of debris can affect the airflow over the surface. Further, performance of surfaces of sensors can be detrimentally impacted by the presence of debris or foreign objects. Thus, it is desirable to formulate self-cleaning, anti-fouling and/or "debris-phobic" coatings or surfaces that can remove the debris by, for example, controlling chemical interactions between the debris and the surface.

Various debris-phobic and self-cleaning surfaces include, for example, superhydrophobic and superoleophobic surfaces, fluoropolymer sheets or treated surfaces, fluorofluid filled surfaces, and enzyme filled coatings, by way of example. Superhydrophobic and superoleophobic surfaces can create high contact angles (e.g., greater than 150°) via a nanostructure between the surface and water and oil drops, respectively, resulting in the drops rolling off the surface rather than remaining on the surface. However, these surfaces do not repel solid foreign matter or contaminant vapors, which can absorb onto the surface and render it ineffective. Solids can remain and interfere with rejection of fluids on these surfaces. Furthermore, over time, the extreme wettability of these surfaces can fade due to environmental exposure or damage, for example, these surfaces can lose functionality (e.g., these surfaces can also lose function if the nanostructured top surface is scratched).

Low surface energy polymers, such as those containing low surface energy perfluoropolyethers and perfluoroalkyl groups, have been explored for low adhesion and solvent repellent applications. While these low-surface energy polymers can facilitate release of materials adhering to them in both water and air, they do not necessarily provide a lubricated surface to promote clearing of foreign matter. While fluoropolymer sheets or treated surfaces have low surface energies and thus low adhesion force between foreign matter and the surface, removal of all soils from the surface is thus problematic.

Thus, there remains a need for robust self-cleaning, anti-fouling surface coatings, which can both prevent and reduce adhesion of debris, including solids and fluids. Moreover, it would be desirable to have precursors for making such anti-fouling surface coatings that have reduced volatile organic compounds, including reduced amounts of non-aqueous solvents.

SUMMARY

This section provides a general summary of the disclosure, and is not a comprehensive disclosure of its full scope or all of its features.

In various aspects, the present disclosure provides an aqueous precursor liquid for forming an anti-fouling heterophasic thermoset polymeric coating. The aqueous precursor liquid includes a first fluorine-containing precursor, a second precursor, a crosslinking agent, water, and optionally an acid or a base. The first fluorine-containing precursor has a functionality greater than about 2 and forms a first fluorine-containing polymer component defining a first phase in the anti-fouling heterophasic thermoset polymeric coating. The second precursor forms a second component defining a second phase in the anti-fouling heterophasic thermoset polymeric coating. The crosslinking agent includes a moiety selected from the group consisting of an amine moiety, a hydroxyl moiety, an isocyanate moiety, and a combination thereof, wherein the crosslinking agent is capable of bonding at least a portion of the first fluorine-containing polymer component in the first phase with at least a portion of the second component in the second phase. The second phase is a continuous phase and the first phase is a discrete phase within the continuous phase, wherein the discrete phase includes a plurality of first domains each having an average size of greater than or equal to about 500 nm to less than or equal to about 25,000 nm. Alternatively, the first phase is the continuous phase and the second phase is the discrete phase within the continuous phase, wherein the discrete phase includes a plurality of second domains each having an average size of greater than or equal to about 500 nm to less than or equal to about 25,000 nm.

The first fluorine-containing polymer component includes a fluoropolymer selected from the group consisting of a polyvinylidene fluoride copolymer, a polyfluoroacrylate, a polytetrafluoroethylene copolymer, a fluorinated polyol, a perfluorocarbon, a perfluoropolyether, a polyfluorosiloxane, a polyvinylidene fluoride, a polytrifluoroethylene, and a combination thereof. The second component is selected from the group consisting of a hygroscopic polymer, a hydrophobic polymer that is not lipophobic, an ionic hydrophilic precursor, an amphiphilic polymer, a fluorosurfactant, and a combination thereof. The hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. The hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. The ionic hydrophilic precursor includes a pendant carboxylate group, an amine group, a sulfate group, a phosphate group, optionally fluorine, and a combination thereof. The amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)— polycaprolactone (PCL) diblock polymer, polyethylene glycol (PEG)—polyethylene (PE) diblock polymer, and polyethylene glycol (PEG)—polystyrene (PS) diblock polymer, and a combination thereof. The fluorosurfactant comprises a fluorinated acid moiety and one or more functional group. The fluorinated acid is selected from the group consisting of perfluorohexanoic acid, perfluorobutanesulfonic acid, perfluorobutane sulfonate, and a combination thereof, and the functional group is selected from the group consisting of a hydroxyl group, an amine group, an isocyanate group, and a combination thereof.

The first fluorine-containing precursor includes a polyol fluoroacrylate or a polyol copolymer of polyvinylidene difluoride.

The aqueous precursor liquid further includes at least one agent selected from the group consisting of an emulsifier, a catalyst, an anti-oxidant, a hindered amine stabilizer, a particulate filler, a pigment, a dye, a plasticizer, a flame retardant, a flattening agent, an adhesion promotor, a salt, and a combination thereof.

The first fluorine-containing polymer component has an average molecular weight of greater than or equal to 10,000 g/mol to less than or equal to about 50,000 g/mol and the second component has an average molecular weight of about 100 g/mol to about 15,000 g/mol.

The first fluorine-containing precursor is a branched fluorine-containing polyol precursor that forms a branched fluorine-containing polymer component.

The second precursor has a cloud point of less than or equal to 100° C.

The aqueous precursor liquid has one or more of the following: (i) solids present in an amount of about 0.005 wt. % to about 30 wt. % solids; and (ii) a pH of about 2 to about 6.

In yet other aspects, a method of treating an article is provided herein. The method includes applying an aqueous precursor liquid to a surface of the article and solidifying the aqueous precursor liquid to form an anti-fouling thermoset polymeric coating on the surface of the article. The aqueous precursor liquid includes a first fluorine-containing precursor having a functionality greater than about 2, a second precursor, a crosslinking agent including a moiety selected from the group consisting of an amine moiety, a hydroxyl moiety, an isocyanate moiety, and a combination thereof, water, and optionally, an acid or a base. The anti-fouling thermoset polymeric coating includes a first phase including a first fluorine-containing polymer formed from the first fluorine-containing precursor and a second phase including a second component formed from the second precursor. The second component is substantially immiscible with the first fluorine-containing polymer. At least a portion of the first fluorine-containing polymer in the first phase and at least a portion of the second component in the second phase are bonded together with a moiety selected from the group consisting of a nitrogen-containing moiety, an oxygen-containing moiety, an isocyanate-containing moiety, and a combination thereof. The second phase is a continuous phase and the first phase is a discrete phase within the continuous phase, wherein the discrete phase includes a plurality of first domains each having an average size of greater than or equal to about 500 nm to less than or equal to about 25,000 nm. Alternatively, the first phase is the continuous phase and the second phase is the discrete phase within the continuous phase, wherein the discrete phase includes a plurality of second domains each having an average size of greater than or equal to about 500 nm to less than or equal to about 25,000 nm.

The first phase includes a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof. The second component is selected from the group consisting of a hygroscopic polymer, a hydrophobic polymer that is not lipophobic, an ionic hydrophilic precursor, an amphiphilic polymer, a fluorosurfactant, and a combination thereof. The hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. The hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. The ionic hydrophilic precursor includes a pendant carboxylate group, an amine group, a sulfate group, a phosphate group, optionally fluorine, and a combination thereof. The amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof. The fluorosurfactant comprises a fluorinated acid moiety and one or more functional group. The fluorinated acid is selected from the group consisting of perfluorohexanoic acid, perfluorobutanesulfonic acid, perfluorobutane sulfonate, and a combination thereof, and the functional group is selected from the group consisting of a hydroxyl group, an amine group, an isocyanate group, and a combination thereof.

The crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked isocyanates, carbodiimide crosslinkers, and a combination thereof. The aqueous precursor liquid optionally further includes a catalyst selected from the group consisting of dibutyl tin dilaurate, dimethyltin dineodecanoate, dioctyltin dineodecanoate, dioctyltin dilaurate, tin octoate, bismuth neodecanoate, bismuth octoate, and a combination thereof.

The second precursor has a cloud point of less than or equal to 100° C.

The aqueous precursor liquid has one or more of the following: (i) solids present in an amount of about 0.005 wt. % to about 2 wt. % solids; and (ii) a pH of about 2 to about 6.

The surface of the article includes a material selected from the group consisting of glass, plastic, fabric, textile, yarn, leather, surface, paint, and a combination thereof.

The method further includes preparing the aqueous precursor liquid by mixing the first fluorine-containing precursor, wherein the first fluorine-containing precursor is waterborne, with the second precursor, water, the crosslinking agent, an optional catalyst, and an optional salt, and optionally adjusting the pH of the aqueous precursor liquid to about 2 to about 6. Alternatively, the method further includes preparing the aqueous precursor liquid by emulsifying a solvent-borne fluorine-containing precursor with water and an emulsifier component to form the aqueous precursor liquid including the first fluorine-containing precursor and mixing the aqueous precursor liquid with the second precursor, water, the crosslinking agent, an optional catalyst, and an optional salt, and optionally adjusting the pH of the aqueous precursor liquid to about 2 to about 6. Alternatively, the method further includes preparing the aqueous precursor liquid by reacting the first fluorine-containing precursor, wherein the first fluorine-containing precursor is water-borne, with a hydrophilic moiety, an ionic moiety, or a combination thereof to form a fluoropolymer and mixing the fluoropolymer with the second precursor, water, the crosslinking agent, an optional catalyst, an optional salt, and optionally adjusting the pH of the aqueous precursor liquid to about 2 to about 6.

Applying of the aqueous precursor liquid to the surface of the article include flowing the aqueous precursor liquid onto and/or into the article in a flow reactor, and optionally heating the aqueous precursor liquid, the article, or a combination thereof to a temperature greater than a cloud point of the second precursor.

In yet other aspects, a heterophasic thermoset polymeric coating is provided. The heterophasic thermoset polymeric coating includes a first phase including a first fluorine-containing polymer component formed from at least a first fluorine-containing precursor having a functionality of greater than 2, and a second phase including a second component formed from a second precursor. The second component is substantially immiscible with the first fluorine-containing polymer component, and at least a portion of the second component in the second phase is bonded together with a moiety selected from the group consisting of a nitrogen-containing moiety, an oxygen-containing moiety, an isocyanate-containing moiety, and a combination thereof. The heterophasic thermoset polymeric coating is formed from an aqueous precursor including water, the first fluorine-containing precursor, and the second precursor. The second phase is a continuous phase and the first phase is a discrete phase within the continuous phase, wherein the discrete phase includes a plurality of first domains each having an average size of greater than or equal to about 500 nm to less than or equal to about 25,000 nm. Alternatively, the first phase is the continuous phase and the second phase is the discrete phase within the continuous phase, wherein the discrete phase includes a plurality of second domains each having an average size of greater than or equal to about 500 nm to less than or equal to about 25,000 nm.

The at least one fluorine-containing precursor includes a polyol fluoroacrylate or a polyol copolymer of polyvinylidene difluoride.

The fluorine-containing polymer component includes a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof. The second component is selected from the group consisting of a hygroscopic polymer, a hydrophobic polymer that is not lipophobic, an ionic hydrophilic precursor, an amphiphilic polymer, a fluorosurfactant, and a combination thereof. The hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. The hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. The ionic hydrophilic precursor includes a pendant carboxylate group, an amine group, a sulfate group, a phosphate group, optionally fluorine, and a combination thereof. The amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof. The fluorosurfactant includes a fluorinated acid moiety and one or more functional group. The fluorinated acid is selected from the group consisting of perfluorohexanoic acid, perfluorobutanesulfonic acid, perfluorobutane sulfonate, and a combination thereof, and the functional group is selected from the group consisting of a hydroxyl group, an amine group, an isocyanate group, and a combination thereof.

The plurality of first domains each have an average size of greater than or equal to about 15,000 nm to less than or equal to about 25,000 nm and/or the plurality of second domains each have an average size of greater than or equal to about 15,000 nm to less than or equal to about 25,000 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
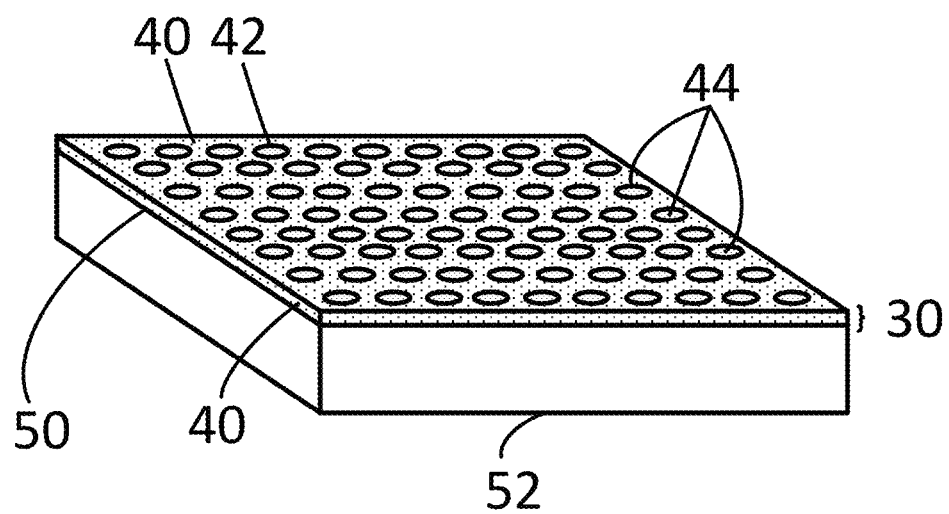
FIG. 1 is a schematic illustrating an example of a surface of an article coated with a heterophasic thermoset polymeric coating prepared according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

In various aspects, as shown in FIG. 1, the present disclosure pertains to a heterophasic thermoset polymeric coating 30 that has a continuous phase 40 and a discrete or discontinuous phase 42 and serves as an anti-fouling coating to minimize adhesion of foreign matter, such as debris, soiling, and the like. The discrete phase defines 42 a plurality of domains 44 of relatively small size distributed within the continuous phase 40. For example, in certain variations, such domains 44 have an average size of greater than or equal to about 500 nm to less than or equal to about 25,000 nm or greater than or equal to about 15,000 nm to less than or equal to about 25,000 nm.

In certain aspects, the plurality of domains 44 are each substantially evenly or homogeneously distributed within the continuous phase 40. The continuous phase 40 can include a first fluorine-containing polymer component as a first phase or a second component as a second phase. The discrete phase 42 can include a first fluorine-containing polymer component as a first phase or a second component as a second phase. In other words, the first fluorine-containing polymer component can be present as the continuous phase 40 and the second component can be present as the discrete phase 42. Alternatively, the second component can be present as the continuous phase 40 and the first fluorine-containing polymer component can be present as the discrete phase 42. When the first fluorine-containing polymer component is present as the discrete phase 42, the plurality of domains 44 can be referred to as a plurality of first domains, which are defined by the first fluorine-containing polymer component. When the second component is present as the discrete phase 42, the plurality of domains 44 can be referred to as a plurality of second domains, which are defined by the second component. The second component is substantially immiscible with the first fluorine-containing polymer component. Further, at least a portion of the second component can be bonded together and/or bonded with the first fluorine-containing polymer component with a moiety selected from the group consisting of a nitrogen-containing moiety, an oxygen-containing moiety, an isocyanate-containing moiety, and a combination thereof.

The heterophasic thermoset polymeric coating 30 is disposed on a surface 50 of an article 52 and thus provides anti-fouling properties to the article 52. It should be noted that FIG. 1 is merely an illustrative simplified schematic and is not to scale, as the plurality of first domains are in fact much smaller than those shown and may be distributed not only at the surface, but within/throughout the bulk of the continuous phase 40.

The present technology thus provides an anti-fouling coating having discrete, separated areas of a first fluorine-containing polymer component (also referred to as "fluorinated material") and a second component exposed on the surface. The first fluorine-containing polymer component is a low surface energy material (<38 mN/m) that inhibits wetting and adhesion while the second, immiscible chemistry breaks up the contact line of the foreign matter, such as soil, along the surface. Low surface energy materials are understood to have a surface tension or energy of less than or equal to about 38 mN/m. Fluorinated low surface energy materials can include "polyfluoroethers," or polymers that contain an ether group having an oxygen atom bonded to two alkyl or aryl groups, where at least one hydrogen atom is replaced in the alkyl or aryl group by a fluorine atom. "Perfluoropolyethers" (PFPE) are a subset of polyfluoroethers that generally refers to a linear polyfluoroether having all hydrogen atoms in the alkyl or aryl groups being replaced by fluorine atoms. Previous thermoplastic anti-fouling coatings generally have used expensive perfluoropolyethers (PFPE), which are linear polymers with oxygen linkages in the backbone. These types of anti-fouling coatings thus serve to break adhesion of foreign matter, such as debris and soils, on the surface as compared to a fluorinated material coating alone or a coating having inclusions of larger sizes and/or of uneven distribution.

While earlier anti-fouling coatings having a continuous matrix with a plurality of low surface energy inclusions have been formed, these coatings may potentially suffer from certain drawbacks. Such earlier coatings were thermoplastics that are less robust than thermoset coatings. In contrast, the present technology provides an anti-fouling coating having a substantially even distribution of a plurality of relatively small domains of a first fluorine-containing polymer or a second component, which is more desirable to minimize adhesion of any debris with the coating. Moreover, in accordance with various aspects of the present disclosure, the coatings prepared in accordance with the present teachings are environmentally friendly and can be made with a water-borne precursor liquid that comprises water and thus minimizes and/or avoids use of volatile organic compounds/non-aqueous solvents.

In certain aspects, an anti-fouling coating creates a first phase, which can be a continuous phase or a discrete phase, from a multifunctional fluorine-containing precursor, such as a multifunctional fluorine-containing polyol. The first fluorine-containing precursor has a functionality of greater than two (2). By a functionality of greater than 2, it is meant that each single precursor molecule has an average of greater than 2 functional groups, such as a hydroxyl group or other functional groups (for example, having an average of 3 or 4 hydroxyl groups per molecule) that react to form a cross-linked fluorine-containing polymer network. The functional groups may be distributed along the backbone of a fluoropolymer, rather than only being present on a terminal end of an oligomer or polymer chain. In certain variations, such a precursor unit may have an average hydroxyl value of less than or equal to about 20 mg KOH/resin g (equivalent weight (EW)=200 g/mol). In certain variations, the fluorine-containing precursor is a branched molecule and when incorporated into the fluorine-containing polymer network provides a branched polymer.

As will be discussed in detail below, a multifunctional fluorine-containing precursor having a functionality of greater than 2, such as a fluorine-containing polyol precursor, reacts to form a cross-linked fluorine-containing polymer network that defines a first phase, e.g., a continuous phase or a discrete phase, in the heterophasic thermosetting anti-fouling polymeric coatings. In certain aspects, the branched fluorine-containing polymer network has a relatively high crosslink density. Such a heterophasic thermosetting polymeric coating has not only an improved durability, but an enhanced ability to repel foreign matter from the coated surface.

In other variations, a multifunctional fluorine-containing precursor having a functionality of greater than 2, such as a fluorine-containing polyol precursor, can react with pendant groups off the backbone of a polymeric isocyanate. The fluorinated groups can crosslink the structure.

Notably, it is difficult to control the size of phase-separated domains when using a multifunctional fluorinated polyol as precursors for a coating, because they bond to other polymer chains along their backbone due to the presence of functional groups therein, instead of bonding only at the terminal end of each chain. In certain aspects, terminal end bonding can promote the chain coiling into a domain size controlled by length of the precursor, such as PFPE precursor. Thus, the high degree of functionality along the backbone of the fluorinated-based polymer increases disorder in the polymer network, making it hard to predict phase separation and difficult to control the size and distribution of the domains. Further, it is difficult to control uniformity in forming phase-separated domains when the precursors are water-borne, due to potential instabilities in the precursor system when it is water-borne and contains water, as compared to a solvent-borne precursor that contains non-aqueous solvents.

However, in accordance with the present disclosure, a coating is provided that contains two chemically distinct microphase separated materials, which enables both materials to be provided along an exposed surface and thus in contact with a foreign agent on the surface, while the chemically distinct nature of the two chemistries inhibits adhesion of the foreign agent (e.g., soils) to the surface. The present disclosure contemplates a combination of nonmiscible chemical functions and controlled phase separation when using a branched fluorinated polyol with a functionality of greater than 2 that can produce a highly crosslinked network due to the high level of hydroxyl groups found throughout the backbone of the fluorinated polymer. Moreover, such a controlled heterophasic coating is capable of being formed via a precursor that is water-based and contains water. In certain aspects, as described further herein, the anti-fouling heterophasic thermoset polymeric coating can be formed on a substrate and delivered as an environmentally friendly water-borne formulation.

In various aspects, the present disclosure provides a heterophasic thermoset polymeric coating that includes a first phase comprising a fluorine-containing polymer network formed at least in part from a multifunctional fluorine-containing precursor having a functionality of greater than 2 ("first fluorine-containing precursor"). A first fluorine-containing precursor may have greater than two functional groups represented by —XH, were X=O or NH. In certain aspects, the fluorine-containing polymer network is branched and/or cross-linked. In certain variations, a first phase comprises a branched fluorine-containing polymer component/network is formed at least in part from a first fluorine-containing precursor having a functionality of greater than 2, meaning that the precursor comprises one or more carbon-fluorine bonds and more than two hydroxyl groups (where X=O).

In certain aspects, the first fluorine-containing precursor is functionalized with more than two hydroxyl groups per unit (e.g., a monomer), also referred to as "a first fluorine-containing polyol precursor." The first fluorine-containing precursor is advantageously soluble or dispersible in water, for example micelle stabilized with surfactants. The first fluorine-containing precursor also comprises fluorine and carbon units. In certain aspects, the monomer may comprise polyvinylidene fluoride/polyvinylidene difluoride (PVDF). In one variation, the first fluorine-containing precursor may comprise a polyvinylidene difluoride copolymer. In one aspect, the first fluorine-containing polyol precursor may have an average hydroxyl value of less than or equal to about 25 mg KOH/resin g (equivalent weight (EW)=approximately 179 g/mol). By way of example, a suitable water-borne fluorine-containing PVDF polyol precursor is ZEFFLE S-7560™ from Daikin. In certain variations, the fluorine-containing precursor may comprise a fluoroacrylate monomer. One suitable acrylate-based fluorine-containing polyol precursor is a C6 based non-ionic fluorocarbon commercially available as EVOPROTECT™ ESA from DyStar.

In certain aspects, the multifunctional fluorine-containing polymer is formed from a monomer comprising PVDF or fluoroacrylate, where the polymer has an average molecular weight, such as weight average molecular weight ($M_w$) of greater than or equal to 2,000 g/mol to less than or equal to about 50,000 g/mol and in certain variations, optionally of greater than or equal to 10,000 g/mol to less than or equal to about 50,000 g/mol. Such molecular weight can be measured by GPC or NMR (end-group analysis), as appreciated by those of skill in the art. As discussed further below, the first fluorine-containing precursor is reacted to form a branched fluorine-containing polymer component/network, which defines a first phase, e.g., a continuous phase or a discrete phase, present in the anti-fouling thermoplastic polymeric coatings.

In certain other alternative aspects, the first fluorine-containing precursor with a functionality of greater than about 2 may include other monomers aside from fluoroacrylates and/or vinylidene fluoride, including by way of example, precursors selected from the group consisting of: tetrafluoroethylene, perfluoroethers, fluorosiloxane, trifluoroethylene, vinyl fluoride, hexafluoropropylene, perflluoropropylvinylether, perfluoromethylvinyl ether, and a combination thereof.

The first fluorine-containing polymer component/network in the coating may include a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof. In certain aspects, the first fluorine-containing polymer component may be formed in part from the fluorine-containing polyol as well as another distinct precursor/monomer, like those listed above. The first fluorine-containing polymer component/network may be present in the heterophasic coating in an amount of greater than or equal to about 20% to less than or equal to about 95% by weight of the total heterophasic coating. In any embodiment, the first fluorine-containing polymer component/network may be a branched fluorine-containing polymer component/network.

The heterophasic thermoset polymeric coating also includes a second component. The second component may be formed from a suitable second precursor. The second component is substantially immiscible with the fluorine-containing polymer component. A miscible material, such as a miscible polymeric material, is one that is capable of being intermixed with another distinct material on the molecular scale, while a substantially immiscible material cannot be intermixed or distributed into another distinct material, but instead forms distinct phases or layers from the main material, without additional manipulation or reaction within the matrix.

In certain aspects, the second component may be a poly(alkene glycol) selected from the group consisting of: poly(ethylene glycol), poly(propylene glycol), poly(tetramethylene glycol), and a combination thereof. In certain variations, the second component is selected from the group consisting of a hygroscopic polymer, a hydrophobic polymer, an ionic hydrophilic precursor or polymer, an amphiphilic precursor or polymer, a fluorosurfactant precursor or polymer, and a combination thereof.

In certain aspects, the hygroscopic polymer is selected from the group consisting of poly(acrylic acid), poly(alkylene glycols), such as polyethylene glycol, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof.

In other aspects, the hydrophobic polymer, which optionally may not be lipophobic, is selected from the group consisting of a polyalkylene glycol, such as poly(propylene glycol), poly(tetramethylene glycol), a polybutadiene, a polycarbonate, a polycaprolactone, a polyacrylic polyol, and a combination thereof. In certain variations, an amphiphilic polymer is a block polymer.

In one aspect, the second component may include an amphiphilic polymer selected from the group of block polymers including polyalkylene glycols, such as polyethylene-block-poly(propylene glycol) polymers. These amphiphilic polymers may include poloxamers, which are nonionic triblock copolymers, where a central hydrophobic moiety, like poly(propylene oxide), is flanked by hydrophilic moieties, like poly(ethylene oxide). Poloxamers include PLURONICS™ triblock polymers. In certain variations, the amphiphilic polymer may be a triblock copolymer comprising poly(ethylene glycol)/poly(ethylene oxide)(PEG/PEO) and poly(propylene oxide) (PPO/PPG) (commercially available as PLURONIC™ P123, 70% PPG). In certain variations, the amphiphilic polymer may be a triblock copolymer comprising poly(ethylene glycol)(PEG)-block-poly/poly(propylene glycol)(PPG)-block-poly(ethylenglycol)(PEG) (commercially available as PLURONIC™ L64, 40 wt % PEG). In other aspects, the amphiphilic polymer may be selected from polyethylene-block-poly(ethylene glycol) polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, copolymers, equivalents, and combinations thereof.

In yet other aspects, the second component may be a hydrophilic polymer or precursor with ionic charge that comprises monomers with an ionic charge, for example, comprising a pendant carboxylate group, an amine group, a sulfate group, a phosphate group, and a combination thereof. Such charged monomers may be inserted along the polymer backbone. Optionally, the hydrophilic polymer may include monomers with an ionic charge, which include fluorine. Thus, in some embodiments, the second precursor and the second component may be fluorinated.

In some aspects, the second component may be a fluorosurfactant comprising a fluorinated acid moiety and one or more functional groups. The fluorinated acid moiety may be selected from the group consisting of perfluorohexanoic acid, perfluorobutanesulfonic acid, perfluorobutane sulfonate, and a combination thereof. The functional group may be selected from the group consisting of a hydroxyl group, an amine group, an isocyanate group, and a combination thereof.

In certain variations, a fluorine-free monomer, such as 2,2-bis(hydroxymethyl)propionic acid (DMPA) having a carboxylic acid group, is mixed with the first fluorine-containing polymer that becomes part of the crosslinked polymer coating and thus defines second component, which defines a second phase.

In certain aspects, the second component is present in the coating in an amount of greater than or equal to about 5% to less than or equal to about 90% by weight of the total heterophasic coating, optionally greater than or equal to about 20% to less than or equal to about 90%, optionally greater than or equal to about 20% to less than or equal to about 50%. The second component may have an average molecular weight (e.g., $M_w$) of greater than or equal to about 100 g/mol to less than or equal to about 15,000 g/mol and optionally the second component has an average molecular weight of greater than or equal to about 500 g/mol to less than or equal to about 5,500 g/mol.

At least a portion of the second component is bonded together with a moiety selected from the group consisting of a nitrogen-containing moiety, an oxygen-containing moiety, an isocyanate-containing moiety, and a combination thereof. Thus, the precursor of the heterophasic thermoset polymeric coating may include a crosslinking agent including a moiety selected from the group consisting of an amine moiety, a hydroxyl moiety, an isocyanate moiety, and a combination thereof. In certain aspects, the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked crosslinkers, such as blocked isocyanates, carbodiimide crosslinkers, and a combination thereof. In certain aspects, the crosslinking agent as described above can promotes reaction between a portion of the second component in the second phase with the first fluorine-containing polymer component in the first phase. Therefore, in such embodiments, at least a portion of the second component is bonded together with a portion of the first fluorine-containing polymer component with a moiety selected from the group consisting of a nitrogen-containing moiety, an oxygen-containing moiety, an isocyanate-containing moiety, and a combination thereof.

The first fluorine-containing component or the second component can form a plurality of domains within the continuous phase (defined by the first phase or the second phase) that are stable and evenly distributed. In any embodiment, the second phase defined by the second component is a continuous phase and the first phase defined by the first fluorine-containing polymer is a discrete phase within the continuous phase, wherein the discrete phase comprises a plurality of first domains defined by the first fluorine-containing polymer. Alternatively, the first phase defined by the first fluorine-containing polymer is the continuous phase and the second phase defined by the second component is the discrete phase within the continuous phase, wherein the discrete phase comprises a plurality of second domains defined by the second component. Furthermore, each domain of the plurality of first domains and the plurality of second domains has an average size of greater than or equal to about 500 nm to less than or equal to about 25,000 nm within the continuous phase. By an average size of a domain, it is meant that at least one dimension of the discrete domain within the continuous matrix, such as a diameter if the domain forms a round shape or alternatively, a length or width, is in the range of ≥500 nm and ≤25,000 nm and in certain aspects, optionally ≥15,000 nm and ≤25,000 nm. In certain aspects, all of the dimensions of the first domain or the second domain may be within the range of ≥500 nm and ≤25,000 nm. In certain other aspects, the plurality of first domains or second domains of the discrete phase is substantially evenly or homogeneously distributed throughout the continuous phase, meaning that the first domains or the second domains are relatively evenly distributed within the continuous phase, while accounting for slight deviations in distances between respective domains. The substantially even distribution of the first domains or the second domains ensures the ability of the coating to provide superior long-term anti-fouling and self-cleaning properties.

In one variation, the heterophasic thermoplastic polymeric coating comprises a branched fluorine-containing polymer component formed from a polyol copolymer of tetrafluoroethylene, an isocyanate-containing moiety, and a second component comprising a polyalkylene glycol, such as polyethylene glycol and/or polypropylene glycol.

In one variation, the heterophasic thermoset polymeric coating comprises a branched fluorine-containing polymer component formed from a polyol copolymer of tetrafluoroethylene, an isocyanate-containing moiety, and a second component comprising a polyalkylene glycol, such as polyethylene glycol and/or polypropylene glycol In another variation, the heterophasic thermoset polymeric coating comprises a branched fluorine-containing polymer component formed from a polyol copolymer of tetrafluoroethylene, an isocyanate-containing moiety, and a second component comprising a comprising a siloxane.

In yet another variation, the heterophasic thermoset polymeric coating comprises a branched fluorine-containing polymer component formed from a polyol copolymer of tetrafluoroethylene, an isocyanate-containing moiety, and a second component formed from an acrylic polyol.

In one variation, the heterophasic thermoplastic polymeric coating comprises a branched fluorine-containing polymer component formed from a polyol copolymer of tetrafluoroethylene, an isocyanate-containing moiety, and a second component formed from an acrylic polyol and a polyalkylene glycol, such as polyethylene glycol and/or polypropylene glycol.

In one variation, the heterophasic thermoset polymeric coating comprises a fluoroacrylate polymer with C6 fluorinated pendant groups, an isocyanate-containing moiety, and a second component formed from a polyalkylene glycol, such as polyethylene glycol and/or polypropylene glycol. Optionally, the heterophasic thermoset polymeric coating can include an ionic and/or hydrophilic moiety, such as DMPA.

The thermoset heterophasic coating may further include at least one further agent or additive selected from the group consisting of an anti-oxidant, a hindered amine stabilizer, a particulate filler, a pigment, a dye, a plasticizer, a flame retardant, a flattening agent, an adhesion promotor, a salt (e.g., NaCl, CaCl$_2$), KCl, MgCl$_2$, KBr, NaNO$_3$, NaSO$_4$, etc.), an acid (e.g., acetic acid, HCl, nitric acid, sulfuric acid, etc.), a base (e.g., NaOH, KOH, NH$_3$, NH$_4$OH, sodium carbonate, sodium bicarbonate, etc.), an anti-bacterial agent, an anti-fungal agent, an anti-static agent, and a combination thereof. Each agent may be present at less than or equal to about 5% by weight of the coating, optionally less than or equal to about 4% by weight of the coating, optionally less than or equal to about 3% by weight of the coating, optionally less than or equal to about 1% by weight of the coating, optionally less than or equal to about 1% by weight of the coating, and in certain aspects, optionally less than or equal to about 0.5% by weight of the coating. In certain aspects, the one or more agents are cumulatively present at less than or equal to about 10% by weight of the coating, optionally less than or equal to about 7% by weight of the coating, optionally less than or equal to about 5% by weight of the coating, optionally less than or equal to about 3% by weight of the coating, optionally less than or equal to about 2% by weight of the coating, and in certain aspects, optionally less than or equal to about 1% by weight of the coating.

The addition of stabilizers directly to polymers can help prevent oxidation, polymer chain scissions and crosslinking reactions caused by exposure to ultraviolet (UV) radiation or high temperatures. Anti-oxidants can be added to minimize or terminate oxidation caused by UV or heat. Hindered amines stabilizers can help minimize or prevent light-induced degradation of the polymer. Additionally, aryl (e.g., phenyl) groups may be added in the polymer chain or at the chain ends to increase thermal stability of the polymer.

The particulate fillers may be selected from, but not limited to, the group consisting of silica, alumina, silicates, talc, aluminosilicates, barium sulfate, mica, diatomite, calcium carbonate, calcium sulfate, carbon, wollastonite, and a combination thereof. The particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

Such additives may be incorporated into the heterophasic thermoset polymeric coating to alter the appearance of the coating. By way of example, colloidal silica may be added to a polymer coating at greater than or equal to about 0.5 weight % to less than or equal to about 5 weight % to reduce gloss.

Examples of suitable anti-bacterial and anti-fungal agents include, but are not limited to quaternary ammonium salts, quaternary ammonium compounds that react into polyurethane chains, silver and zinc containing zeolites, and zinc salts.

In other aspects, the anti-fouling heterophasic thermoplastic polymeric coating may further include yet another third polymer as a block, which may be capable of physiosorbing onto specific surfaces. For example, such a third polymer block may be a polyurethane that hydrogen bonds with polyester and nylon surfaces.

In certain aspects, the present disclosure contemplates forming a water-borne liquid precursor of the heterophasic thermoset polymeric coating. The liquid precursor may include a first fluorine-containing precursor having a functionality greater than about 2 that forms a fluorine-containing polymer component defining a first phase, e.g., a continuous phase or a discrete phase, in the heterophasic thermoset polymeric coating, such as any of the examples described above. The fluorine-containing polymer component may be a branched fluorine-containing polymer component formed from a multifunctional branched fluorine-containing polyol precursor. The liquid precursor may also include a second precursor that forms a second component present as a second phase, e.g., a continuous phase or a discrete phase. The second precursor may form a second component, such as any of the examples described above. When the second phase defined by the second component is a continuous phase and the first phase defined by the first fluorine-containing polymer is a discrete phase within the continuous phase, the discrete phase comprises a plurality of first domains defined by the first fluorine-containing polymer, each first domain having an average size of greater than or equal to about 500 nm to less than or equal to about 25,000 nm. Alternatively, when first phase defined by the first fluorine-containing polymer is the continuous phase and the second phase defined by the second component is the discrete phase within the continuous phase, the discrete phase comprises a plurality of second domains defined by the second component, each second domain has an average size of greater than or equal to about 500 nm to less than or equal to about 25,000 nm within the continuous phase.

A crosslinking agent comprising a moiety selected from the group consisting of an amine moiety, a hydroxyl moiety, an isocyanate moiety, and a combination thereof may be included in the liquid precursor. The crosslinking agent may be any of those described above and is capable of bonding at least a portion of the first fluorine-containing polymer component in the first phase with at least a portion of the second component in the second phase.

A water-borne liquid precursor may be an aqueous precursor that includes water and optionally an aqueous solvent, such as polar solvents like methanol, ethanol, propanol, butanol, acetone, and the like. Notably, the term solvent more broadly encompasses carriers rather, than strictly solvating compounds capable of dissolving and forming a solution with all components in the precursor. To become water-borne, the various components may be emulsified in water, optionally using one or more surfactants, or chemically modified with ionic groups and/or hydrophilic groups to aid in emulsification and stabilization.

To form a water-borne formulation, the first fluorine-containing precursor and optionally other components may be selected to be water-borne components or may be altered to be compatible with an aqueous system. For example, a solvent-borne precursor can be emulsified in water with surfactants. The solvent-borne precursor is mixed with the one or more surfactants of choice and stirred rapidly while adding water dropwise until the amount of solvent is less than or equal to 10 wt. %. The solution is continuously stirred with or without gentle (for example, approximately 30° C.) heating until a dispersion is obtained.

Alternatively, a solvent borne precursor is optionally chemically bonded to a first precursor that enables water dispersibility, such as ionic and/or hydrophilic groups. Some examples include 2,2-bis(hydroxymethyl)propionic acid (DMPA), triethylene glycol, and polyethylene glycol.

Hence, in certain aspects, the aqueous precursor may also include non-aqueous solvents, which may be present as carriers for one or more of the starting materials, by way of non-limiting example. When present, a non-aqueous solvent is selected from the group consisting of n-butyl acetate, methyl ethyl ketone, acetone, methyl isobutyl ketone, methyl isopropyl ketone, methyl sec-butyl ketone xylene, tetrahydrofuran, cyclohexane, 2-butyoxyethanol acetate, toluene, and a combination thereof. In certain aspects, water is present at greater than or equal to about 50% to less than or equal to about 80% by weight of the aqueous precursor. In certain aspects, the various precursors may be combined and the resin may be diluted with water, so that the resin is present at greater than or equal to about 1% to less than or equal to about 50% by weight of the water-borne liquid precursor.

In certain variations, the precursor liquid may comprise an emulsifier, such as a surfactant. Suitable surfactants include, but are not limited to, ionic surfactants, like sodium dodecyl sulfate (SDS), non-ionic surfactants, such as sorbitan esters (SPAN™), and polyethoxylated sorbitan esters (TWEEN™), and a combination thereof. The emulsifier(s) are present at greater than or equal to about 0.05% to less than or equal to about 5% by weight of the liquid precursor.

In certain other aspects, the liquid precursor may optionally include a catalyst to promote reaction of the precursors. The catalyst may be selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

The liquid precursor may also include at least one further agent selected from the group consisting of an anti-oxidant, a hindered amine stabilizer, a particulate filler, a pigment, a dye, a plasticizer, a flame retardant, a flattening agent, an adhesion promotor, a salt, an acid, a base, an anti-bacterial agent, an anti-fungal agent, and a combination thereof, such as any of those described above.

The present technology is relevant to surface modification of various components susceptible to exposure to soiling, especially those in automotive and other vehicle applications, by way of non-limiting example. For example, various automobile interior and exterior surfaces may be coated with the heterophasic thermoplastic polymeric coatings of the present teachings to have increased stain resistance and cleanability. The coatings may be applied to a variety of surfaces, including a surface of a material selected from the group consisting of fabric or textile, yarn, plastic, leather, glass, paint (e.g., a painted surface), metal, and a combination thereof.

Although automotive applications are generally discussed, the anti-fouling heterophasic thermoplastic polymeric coating may also be used in other applications such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like.

In certain variations, a method of treating an article is provided by the present disclosure. The article may include a wheel, a steering wheel, a lens, a sensor, such as LIDAR sensor or ultrasonic back-up sensor, glass (such as a window, a windshield, and the like), a plastic (such as hard plastics, like polycarbonate, vinyl), a fabric, a yarn, a leather surface, a painted surface, a window, a metal panel, and equivalents and combinations thereof.

The method may include (a) applying a precursor liquid to a surface of the article. The aqueous precursor liquid can be delivered as about 0.005 wt. % to about 30 wt. % solids, about 0.005 wt. % to about 15 wt. % solids, about 0.005 wt. % to about 5 wt. % solids, about 0.005 wt. % to about 2 wt. % solids, about 0.01 wt. % to about 3 wt. % solids, or about 0.05 wt. % to about 1 wt. % solids.

In any embodiment, a precursor liquid can be in a concentrate form, for example, solids can be present in amount of about 5 wt. % to about 30 wt. % solids. Prior to application, a precursor liquid concentrate can be diluted with water so that the precursor liquid can be delivered at about 0.005 wt. % to about 2 wt. % solids or about 0.05 wt. % to about 1 wt. % solids. Additionally or alternatively, a precursor liquid may be applied in a ratio relative to mass of the article, e.g., yarn, cloth, etc., being treated. For example, a precursor liquid may be applied at about 1% to about 10% the weight of the article compared to mass of a precursor liquid, for example, mass of a precursor liquid concentrate.

The precursor liquid or solution may be an emulsion. The precursor liquid includes a first fluorine-containing precursor having a functionality greater than about 2 that forms a fluorine-containing polymer including those described above. The fluorine-containing polymer may be a branched fluorine-containing polymer component formed from a multifunctional branched fluorine-containing polyol precursor. The precursor liquid also includes a second precursor that forms the second component including those described above, a crosslinking agent comprising a moiety selected from the group consisting of an amine moiety, a hydroxyl moiety, an isocyanate moiety, and a combination thereof including those described above, and water like those described above. The precursor liquid may also optionally include an acid or a base as described herein to adjust the pH of the aqueous precursor liquid, for example, to a pH of about 2 to about 10, about 2 to about 8, or about 2 to about 6. In any embodiment, the second precursor can have cloud point of less than or equal to about 100° C., less than or equal to about 80° C., or less than or equal to about 60° C.

In certain variations, an emulsifier is present like those described above. Further, other solvents, such as aqueous or polar solvents and non-aqueous or non-polar solvents may be included in the precursor liquid. The liquid precursor may also include at least one further agent selected from the group consisting of a catalyst, an anti-oxidant, a hindered amine stabilizer, a particulate filler, a pigment, a dye, a plasticizer, a flame retardant, a flattening agent, an adhesion promotor, an anti-bacterial agent, an anti-fungal agent, a salt, and a combination thereof, such as any of those described above. The applying of the precursor liquid to the surface may be any coating technique, including but not limited to, spraying, brushing, dip coating, doctor-blade coating, spin coating, pad applying, casting, printing, in a flow system, and the like. In one aspect, the precursor liquid may be applied by spraying onto target regions of the surface of a material or by applying a pad with the precursor liquid to target regions of the surface of a material. After application, the material may be compressed to release any excess precursor liquid followed by solidifying the precursor liquid on the material, for example, via heating, to form an anti-fouling thermoset polymeric coating on the material.

In one aspect, the precursor liquid may be applied in a flow system, such as a flow reactor. In such embodiments, a precursor liquid can be flowed through a material, such as yarn, which can be wound around a spool, in a flow reactor for a suitable amount of time at a suitable temperature. Following application of the precursor liquid, excess precursor liquid may be drained and the precursor liquid may be solidified on the material, for example, via heating the spools in an oven or dryer, to form an anti-fouling thermoset polymeric coating on the material. It has been discovered that in order to improve deposition of the second precursor from the precursor liquid onto the material surface, the second precursor can be destabilized. For example, a salt (e.g., NaCl, $CaCl_2$), KCl, $MgCl_2$, KBr, $NaNO_3$, $NaSO_4$, etc.) may be added to the precursor liquid to destabilize the second precursor, for example, a salt may be added to an aqueous solution of the second precursor. Additionally or alternatively, the precursor liquid, the material or a combination thereof may be heated to a temperature greater than a cloud point of the second precursor. For example, if the second precursor has a cloud point of about 50° C., the precursor liquid and/or the material may be heated to temperature greater than 50° C., for example, about 55° C., about 60° C., about 65° C., about 70° C., about 75° C., or about 80° C. during application of the precursor liquid in the flow system.

In certain aspects, the method may also include preparing the precursor by mixing a water-borne first fluorine-containing precursor with second precursor, water, the cross-linking agent, an optional catalyst, an optional salt, and optionally adjusting the pH of the precursor liquid to about 2 to about 8, or about 2 to about 6, for example, by adding a suitable acid or base.

In another variation, preparing the precursor may include emulsifying a solvent-borne fluorine-containing precursor with water and an emulsifier component to form the aqueous precursor comprising the first fluorine-containing precursor and mixing the aqueous precursor with the second precursor, water, the crosslinking agent, an optional catalyst, and an optional salt, and optionally adjusting the pH of the aqueous precursor liquid to about 2 to about 8, or about 2 to about 6, for example, by adding a suitable acid or base. The solvent-borne precursor may be mixed with one or more surfactants and stirred rapidly while adding water dropwise until the amount of solvent is less than or equal to about 10% by weight. The solution may be continuously stirred with or without a gentle heating (e.g., around 30° C.) until a dispersion is formed.

In yet another variation, preparing the precursor may include reacting the first fluorine-containing precursor, where the first fluorine-containing precursor is solvent-borne or water-borne, with a hydrophilic moiety, an ionic moiety, or a combination thereof to form a fluoropolymer and mixing the fluoropolymer with the second precursor, water, the crosslinking agent, an optional catalyst, and an optional salt, and optionally adjusting the pH of the aqueous precursor liquid to about 2 to about 8, or about 2 to about 6, for example, by adding a suitable acid or base. Some examples of the hydrophilic or ionic moieties include 2,2-bis(hydroxymethyl)propionic acid (DMPA), triethylene glycol, and polyethylene glycol, that may be reacted with the solvent-borne fluorine-containing precursor.

In yet another variation, preparing the precursor liquid may include mixing the second precursor with water, the cross-linking agent, an optional catalyst, an optional salt, and optionally adjusting the pH of the precursor liquid to about 2 to about 8, or about 2 to about 6, for example, by adding a suitable acid or base, followed by mixing with the first fluorine-containing precursor.

The method also further includes (b) solidifying the aqueous precursor liquid to form an anti-fouling heterophasic thermoplastic polymeric coating on the surface of the article. The solidifying may include heating the precursor material and/or applying energy, such as actinic radiation (e.g., ultraviolet radiation) or electron beam to facilitate a crosslinking reaction of the precursors and removal of the water and/or solvent(s). In certain variations, the water and/or solvent(s) may be evaporated or volatilized from the applied precursor material and then the material may be heated, for example in an oven or a reactor, to form the solid polymer. In certain variations, the methods may be environmentally friendly and may be substantially free of volatile organic compounds (VOC) or may significantly reduce VOC emissions. In one variation, no VOCs may be emitted during the coating process. In another variation, a low VOC process may have a VOC content of less than or equal to about 380 g/L, optionally less than or equal to about 250 g/L and in certain variations, optionally less than or equal to about 50 g/L.

The anti-fouling self-cleaning heterophasic thermoplastic polymeric coating thus formed includes a first phase, e.g., a continuous phase or a discrete phase defining a plurality of first domains, including the fluorine-containing polymer component, which may be a branched fluorine-containing polymer, and a second phase comprising a second component, e.g., as a continuous phase or as a discrete phase defining a plurality of second domains, including all of those examples previously described above. The second component is substantially immiscible with the first fluorine-containing polymer. Each first domain of the plurality of first domains and each second domain of the plurality of second domains has an average size of greater than or equal to about 500 nm to less than or equal to about 25,000 nm within the continuous phase. At least a portion of the first fluorine-containing polymer component in the first phase can be bonded with at least a portion of the second component in the second phase via a moiety selected from the group consisting of a nitrogen-containing moiety, an oxygen-containing moiety, an isocyanate-containing moiety, and a combination thereof.

In certain variations, the heterophasic thermoset polymeric coating can scatter between about 10% and 50% of incident light, or about 10 to about 20% incident light. The aforementioned scattering of incident light is measured by forming a heterophasic thermoset polymeric coating as a film and measuring % transmission in a UV/VIS spectrometer as understood by one of ordinary skill in the art. Additionally or alternatively, the heterophasic thermoset polymeric coating can have an average light absorbency of greater than or equal to about 5% to less than or equal to about 100% per 0.01 cm thickness of the polymeric coating over a wavelength range of about 400 nm to about 800 nm, optionally greater than or equal to about 5% to less than or equal to about 35% per 0.01 cm thickness of the polymeric coating. In certain aspects, the heterophasic thermoset polymeric coating has an average light absorbency of greater than or equal to about 5% to less than or equal to about 100%, optionally greater than or equal to about 5% to less than or equal to about 35%, where the coating has a thickness of greater than or equal to about 50 μm to less than or equal to about 500 μm. In certain aspects, the branched fluorine-containing polymer component may be a highly crosslinked network having a relatively high crosslink density rendering it insoluble. Such a heterophasic thermosetting anti-fouling polymeric coating has not only an improved durability, but also an enhanced ability to repel foreign matter from the coated surface.

In certain variations, prior to applying the precursor liquid to the surface to be treated, an adhesion layer may be applied to the surface or an adhesion-promoting agent may be added to the liquid precursor to form an adhesion-promoting layer. Examples of suitable adhesion promotors include, but are not limited to, alkoxysilanes that create chemical groups on a surface that bond to polyols such as (3-Glycidyloxypropyl) trimethoxysilane (GPTMS), (3-Aminopropyl) triethoxysilane (APS), (3-Aminopropyl) triethoxysilane (APS) with (3,3,3-Trifluoropropyl) trimethoxysilane (FPTS), or (3-Aminopropyl) triethoxysilane (APS) with Trimethoxyphenylsilane (TMPS), and a combination thereof.

Various embodiments of the inventive technology can be further understood by the specific examples contained herein. Specific non-limiting Examples are provided for illustrative purposes of how to make and use the compositions, devices, and methods according to the present teachings.

EXAMPLES

Example 1—Preparation and Application of a First Stain Treatment Coating

A first stain treatment containing EvoProtect ESA (15-50 wt %), Pluronic L64 (1-10 wt %), DMPA (0.0-5 wt %), Bayhydur® BL-2867 (1-5 wt %) and the balance water was compounded as a concentrated formula. The first stain treatment was diluted and applied to a knit made from 140 total denier twisted pair yarn fabric via pad application to produce "pad applied treatment yarn" and via a flow reactor to produce "flow reactor applied treatment yarn." The pad application method used the following procedure: untreated fabric was dipped into diluted first stain treatment for 5 minutes, allowed to drip dry for 10 minutes, and heated up to 150° C. to dry and cure the coating to produce "pad applied treatment yarn". The flow reactor application method used the following procedure: diluted first stain treatment formulation was flowed through spools of untreated yarn while the flow reactor reached 80° C. to deposit the stain treatment; further heat treatment up to 150° C. to dry and cure the material produced "flow reactor applied treatment yarn." A Vaseline stain and an ink stain were separately applied to the pad applied treatment yarn and the flow reactor applied treatment yarn. A Vaseline stain and an ink stain were separately applied to a fabric without the stain treatment ("untreated yarn") for comparison. Stain release results are show in Table 1 below. Stain release results are designated with excellent, good, fair, and poor versus the untreated fabric

TABLE 1

Stain Test Results with First Stain Treatment

| Debris phobic treatment method on knit cloth | Pen | Vaseline |
| --- | --- | --- |
| Untreated Yarn | Good | Good |
| Pad Applied Treatment Yarn | Good | Excellent |
| Flow Reactor Applied Treatment Yarn | Excellent | Excellent |

Compared to the untreated yarn, both formulations with Pluronic and DMPA showed better stain release performance on pen and/or Vaseline stains. The flow reactor applied treatment yarn treatment showed equivalent stain release of Vaseline and improved stain release of pen compared to the pad applied treatment yarn.

Figure 2:
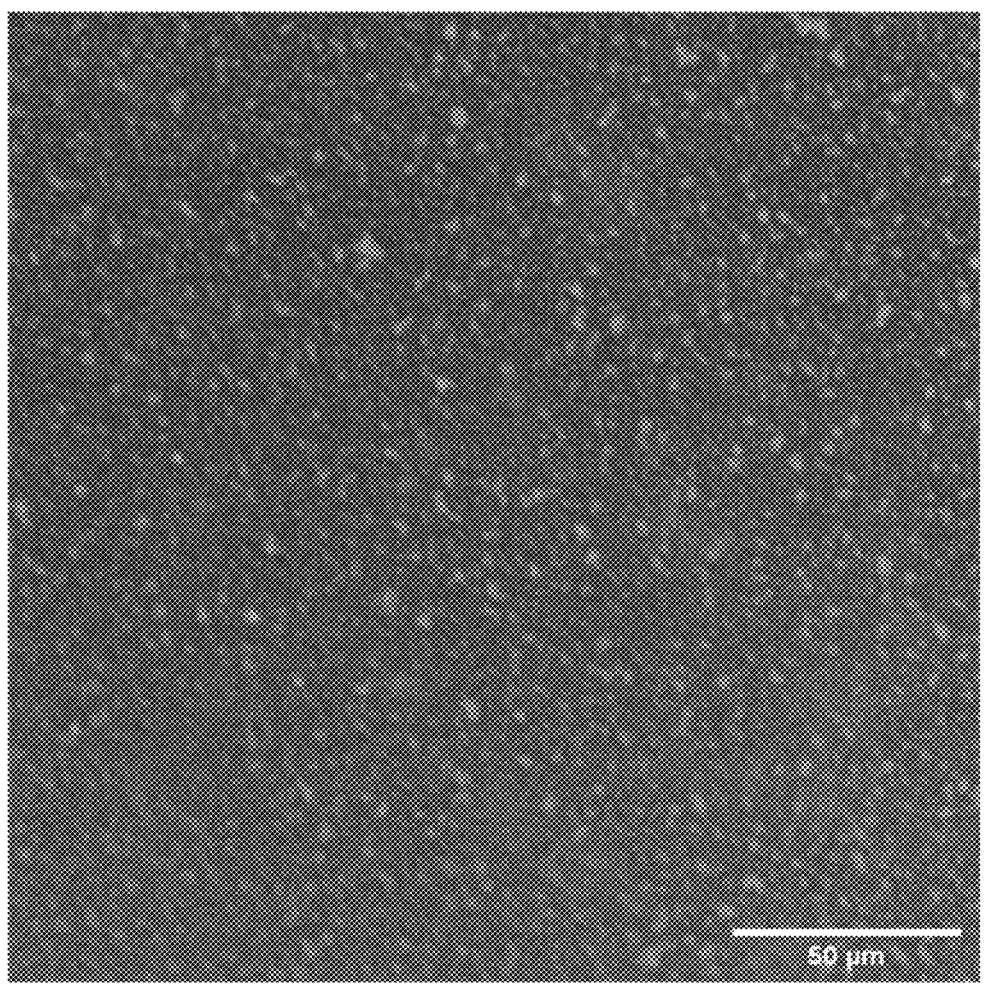
FIG. 2 is a confocal microscopy image of an anti-fouling heterophasic coating showing hydrophobic fluoroacrylate (darker or black regions) and hydrophilic fluorosurfactant (lighter or green regions) domains in the coating.

Example 2—Preparation of a Second Stain Treatment and Comparison of Stain Treatment Coatings A second stain treatment containing EvoProtect ESA (5-30 wt %), Phobol CP-R (20-45 wt %), Bayhydur® BL-2867 (0.5-5 wt %) and the balance water was compounded as a concentrated formula. A freestanding film sprayed with the second stain treatment was soaked with a fluorescent dye. The film is then imaged using Laser scanning confocal microscope. The sample is excited with an Argon laser, emitting fluorescence at 512 nm. Upon drying the fluoroacrylate and fluorosurfactant form an immiscible heterophasic polymer coating as shown in FIG. 2. FIG. 2 shows a magnification level with a 50 μm scale bar. The lighter or more fluorescent green areas represent areas rich in Phobol CP-R (fluorosurfactant) and the darker or black regions represent hydrophobic EvoProtect ESA (fluoroacrylate). These discrete domains have sizes within the range of 100-5,000 nm.

To show the effect of the heterophasic coating, the second stain treatment (Sample 4 in Table 2) of FIG. 2 was tested for stain release on fabric along with the following other comparative coatings: EvoProtect ESA and Bayhydur® BL-2867 in water (Sample 2 in Table 2), Phobol CP-R and Bayhydur® BL-2867 in water (Sample 3 in Table 2). The aforementioned coatings were applied to fabric, cured, and tested for stain release. Untreated fabric was also tested for stain release as a control sample (Sample 1 in Table 2) The results are shown in Table 2 and the heterophasic structure exceeds the stain release of untreated fabric, crosslinked fluoroacrylate, or crosslinked fluorosurfactants.

TABLE 2

Stain test results of all fluorinated coatings compared to untreated fabric. Stain release results are designated with excellent, good, fair, and poor versus the untreated fabric.

| Sample | Coating Composition | Pen | Vaseline |
| --- | --- | --- | --- |
| 1 | Untreated | Poor | Fair |
| 2 | EvoProtect ESA and Bayhydur ® BL-2867 in water | Poor | Poor |

TABLE 2-continued

Stain test results of all fluorinated coatings compared to untreated fabric. Stain release results are designated with excellent, good, fair, and poor versus the untreated fabric.

| Sample | Coating Composition | Pen | Vaseline |
|---|---|---|---|
| 3 | Phobol CP-R and Bayhydur ® BL-2867 in water | Fair | Good |
| 4 | EvoProtect ESA, Phobol CP-R, Bayhydur ® BL-2867 in water | Good | Good/Excellent |

Example 3—Preparation of a Third Stain Treatment

Figure 3:
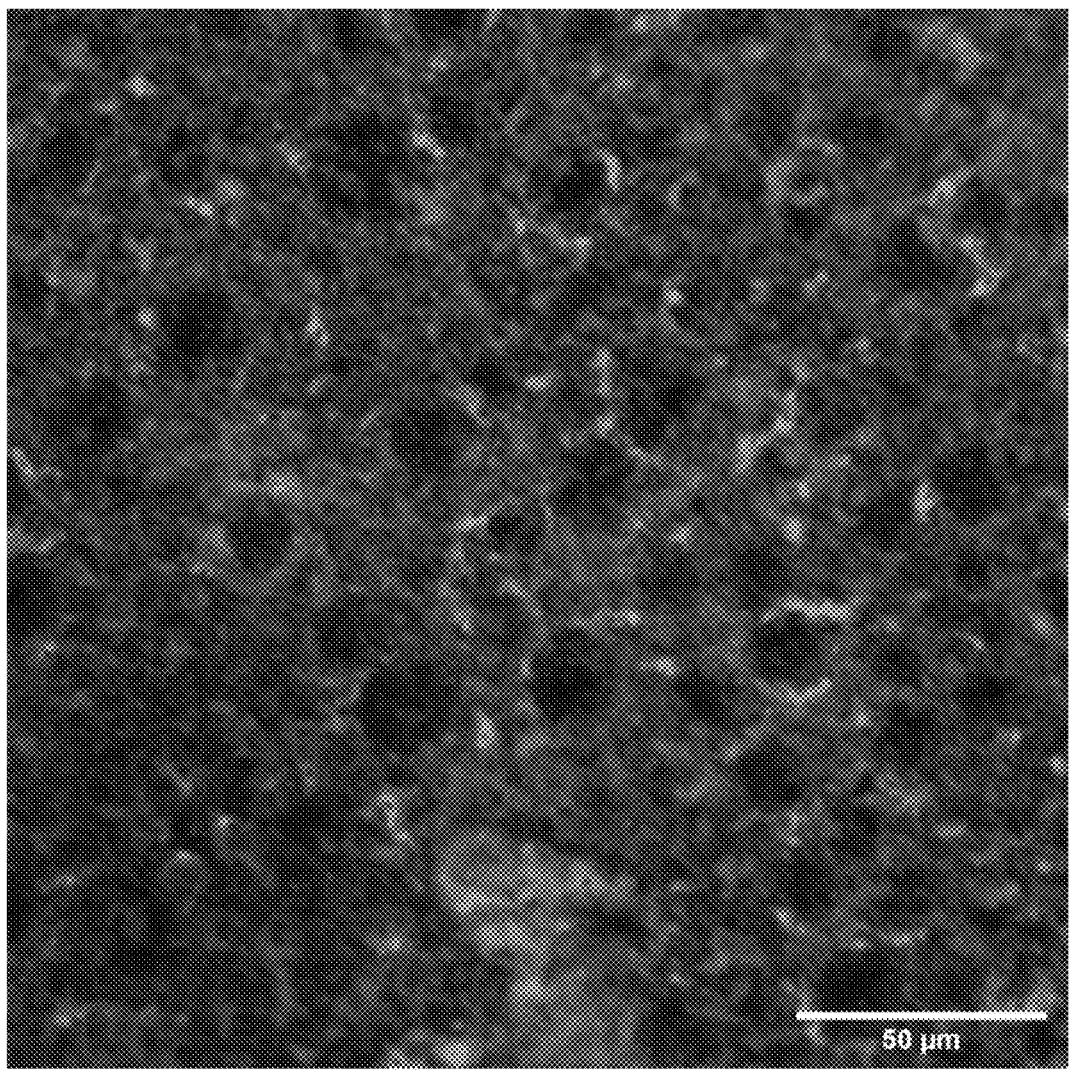
FIG. 3 is a confocal microscopy image of an anti-fouling heterophasic coating showing fluorinated hydrophobic fluoroacrylate (darker or black regions) and hydrophilic triblock copolymer amphiphilic polymer (lighter or green regions) domains in the coating.

A third stain treatment was prepared with EvoProtect ESA (15-50 wt %), Pluronic L64 (0.5-10 wt %), DMPA (0.05-2.5 wt %), Bayhydur® BL-2867 (1-5 wt %) and the balance water, which were all compounded, dried to form a freestanding film, and soaked with a fluorescent dye and imaged using Laser scanning confocal microscope as described above in Example 2. FIG. 3 shows phase separation within a heterophasic polymeric coating prepared using the third stain treatment. FIG. 3 shows a magnification level with a 50 µm scale bar. The lighter or more fluorescent green areas represent thydrophilic regions containing the Pluronic L64 while the darker or black regions are hydrophobic and contain the EvoProtect ESA (fluoroacrylate).

Example 3—Preparation of a Third Stain Treatment

Figure 4:
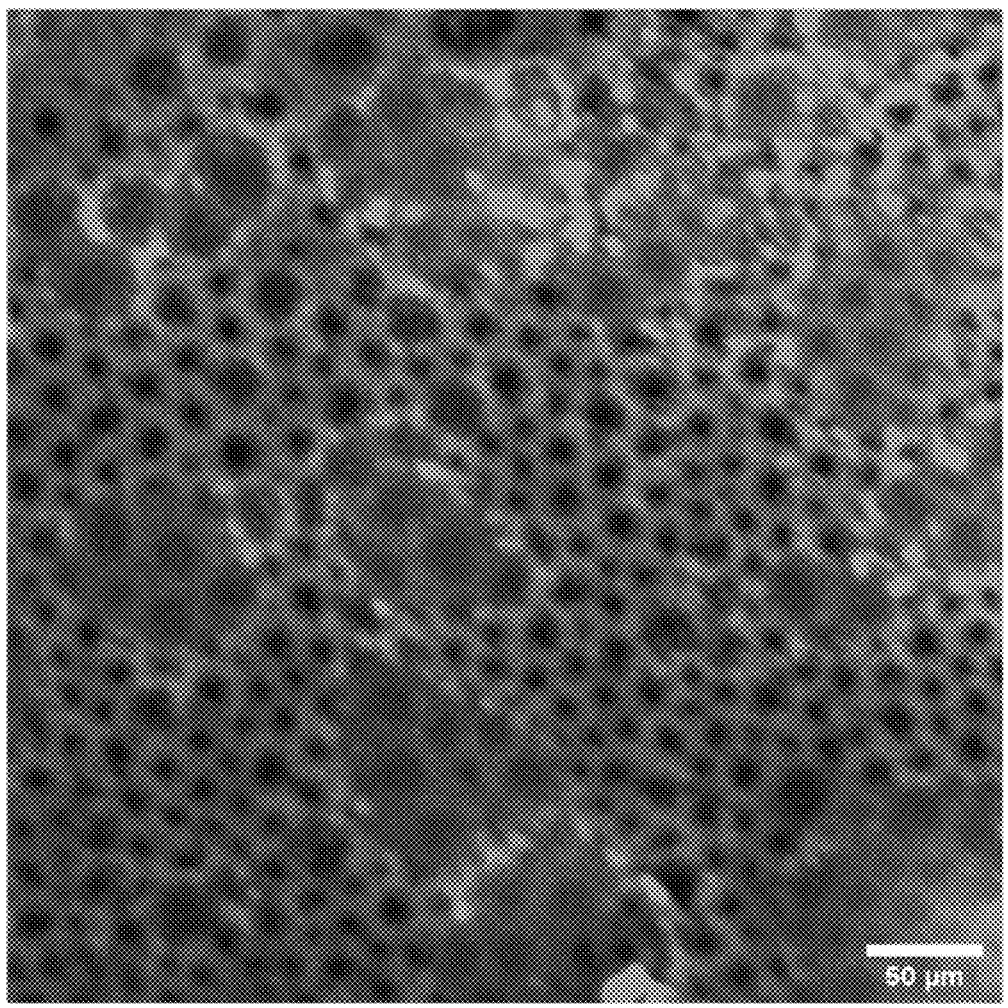
FIG. 4 is a confocal microscopy image of an anti-fouling heterophasic coating showing fluorinated hydrophobic fluoroacrylate (darker or black regions) and hydrophilic triblock copolymer amphiphilic polymer (lighter or green regions) domains in a coating.

A fourth stain treatment was prepared with EvoProtect ESA (15-50 wt %), Pluronic P84 (0.5-10 wt %), DMPA (0.05-2.5 wt %), Bayhydur® BL-2867 (1-5 wt %) and the balance water, which were all compounded, dried to form a free standing film, and soaked with fluorescent dye and imaged using Laser scanning confocal microscope as described above in Example 2. FIG. 4 shows phase separation within a heterophasic polymeric coating prepared using the fourth stain treatment. FIG. 4 shows a magnification level with a 50 µm scale bar. The lighter or more fluorescent green areas represent hydrophilic regions containing the Pluronic L64 while the darker or black regions are hydrophobic and contain the EvoProtect ESA (fluoroacrylate).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aqueous precursor liquid for forming an anti-fouling heterophasic thermoset polymeric coating, wherein the aqueous precursor liquid comprises:
a first fluorine-containing precursor having a functionality greater than about 2 that forms a first fluorine-containing polymer component defining a first phase in the anti-fouling heterophasic thermoset polymeric coating;
a second precursor that forms a second component defining a second phase in the anti-fouling heterophasic thermoset polymeric coating;
a crosslinking agent comprising a moiety selected from the group consisting of an amine moiety, a hydroxyl moiety, an isocyanate moiety, and a combination thereof, wherein the crosslinking agent is capable of bonding at least a portion of the first fluorine-containing polymer component in the first phase with at least a portion of the second component in the second phase;
water; and
optionally, an acid or a base;
wherein when the second phase is a continuous phase, the first phase is a discrete phase within the continuous phase, wherein the discrete phase comprises a plurality of first domains each having an average size of greater than or equal to about 500 nm to less than or equal to about 25,000 nm; or
wherein when the first phase is the continuous phase, the second phase is the discrete phase within the continuous phase, wherein the discrete phase comprises a plurality of second domains each having an average size of greater than or equal to about 500 nm to less than or equal to about 25,000 nm.

2. The aqueous precursor liquid of claim 1, wherein:
(i) the first fluorine-containing polymer component comprises a fluoropolymer selected from the group consisting of a polyvinylidene fluoride copolymer, a polyfluoroacrylate, a polytetrafluoroethylene copolymer, a fluorinated polyol, a perfluorocarbon, a perfluoropolyether, a polyfluorosiloxane, a polyvinylidene fluoride, a polytrifluoroethylene, and a combination thereof; and
(ii) the second component is selected from the group consisting of a hygroscopic polymer, a hydrophobic polymer that is not lipophobic, an ionic hydrophilic precursor, an amphiphilic polymer, a fluorosurfactant, and a combination thereof, wherein:
(a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly (vinylpyrolidone), a modified cellulose polymer selected from the group consisting of carboxymethyl cellulose, hydroxyethyl cellulose, hydroxypropyl cellulose, methyl cellulose, and a combination thereof;
(b) the hydrophobic polymer is selected from the group consisting of a polyalkylene glycol selected from the group consisting of poly(propylene glycol), poly (tetramethylene glycol), a polybutadiene, a polycarbonate, a polycaprolactone, a polyacrylic polyol, and a combination thereof;
(c) the ionic hydrophilic precursor comprising a pendant carboxylate group, an amine group, a sulfate group, a phosphate group, optionally fluorine, and a combination thereof;
(d) the amphiphilic polymer is selected from the group consisting of poloxamers, a polyethylene-block-poly (ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof; and (e) the fluorosurfactant comprises a fluorinated acid moiety and one or more functional group, wherein the fluorinated acid is selected from the group consisting of perfluorohexanoic acid, perfluorobutanesulfonic acid, perfluorobutane sulfonate, and a combination thereof; and wherein the functional group is selected from the group consisting of a hydroxyl group, an amine group, an isocyanate group, and a combination thereof.

3. The aqueous precursor liquid of claim 1, wherein the first fluorine-containing precursor comprises a polyol fluoroacrylate or a polyol copolymer of polyvinylidene difluoride.

4. The aqueous precursor liquid of claim 1, further comprising at least one agent selected from the group consisting of an emulsifier, a catalyst, an anti-oxidant, a hindered amine stabilizer, a particulate filler, a pigment, a dye, a plasticizer, a flame retardant, a flattening agent, an adhesion promotor, a salt, and a combination thereof.

5. The aqueous precursor liquid of claim 1, wherein the first fluorine-containing polymer component has an average molecular weight of greater than or equal to 10,000 g/mol to less than or equal to about 50,000 g/mol and the second component has an average molecular weight of about 100 g/mol to about 15,000 g/mol.

6. The aqueous precursor liquid of claim 1, wherein the first fluorine-containing precursor is a branched fluorine-containing polyol precursor that forms a branched fluorine-containing polymer component.

7. The aqueous precursor liquid of claim 1, wherein the second precursor has a cloud point of less than or equal to 100° C.

8. The precursor liquid of clam 1, wherein the aqueous precursor liquid has one or more of the following:
  (i) solids present in an amount of about 0.005 wt. % to about 30 wt. % solids; and
  (ii) a pH of about 2 to about 6.

9. A method of treating an article comprising:
  (a) applying an aqueous precursor liquid to a surface of the article, wherein the aqueous precursor liquid comprises:
    a first fluorine-containing precursor having a functionality greater than about 2;
    a second precursor;
    a crosslinking agent comprising a moiety selected from the group consisting of an amine moiety, a hydroxyl moiety, an isocyanate moiety, and a combination thereof;
    water; and
    optionally, an acid or a base; and
  (b) solidifying the aqueous precursor liquid to form an anti-fouling thermoset polymeric coating on the surface of the article, wherein the anti-fouling thermoset polymeric coating comprises:
    a first phase comprising a first fluorine-containing polymer formed from the first fluorine-containing precursor; and
    a second phase comprising a second component formed from the second precursor, wherein the second component is substantially immiscible with the first fluorine-containing polymer;
    wherein at least a portion of the first fluorine-containing polymer in the first phase and at least a portion of the second component in the second phase are bonded together with a moiety selected from the group consisting of a nitrogen-containing moiety, an oxygen-containing moiety, an isocyanate-containing moiety, and a combination thereof; and
    wherein when the second phase is a continuous phase, the first phase is a discrete phase within the continuous phase, wherein the discrete phase comprises a plurality of first domains each having an average size of greater than or equal to about 500 nm to less than or equal to about 25,000 nm; or
    wherein when the first phase is the continuous phase, the second phase is the discrete phase within the continuous phase, wherein the discrete phase comprises a plurality of second domains each having an average size of greater than or equal to about 500 nm to less than or equal to about 25,000 nm.

10. The method of claim 9, wherein:
(i) the first phase comprises a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof; and
(ii) the second component is selected from the group consisting of a hygroscopic polymer, a hydrophobic polymer that is not lipophobic, an ionic hydrophilic precursor, an amphiphilic polymer, a fluorosurfactant, and a combination thereof, wherein:
  (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;
  (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;
  (c) the ionic hydrophilic precursor comprising a pendant carboxylate group, an amine group, a sulfate group, a phosphate group, optionally fluorine, and a combination thereof;
  (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lactic-co-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof; and
  (e) the fluorosurfactant comprises a fluorinated acid moiety and one or more functional group, wherein the fluorinated acid is selected from the group consisting of perfluorohexanoic acid, perfluorobutanesulfonic acid, perfluorobutane sulfonate, and a combination thereof; and wherein the functional group is selected from the group consisting of a hydroxyl group, an amine group, an isocyanate group, and a combination thereof.

11. The method of claim 9, wherein:
   (i) the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked isocyanates, carbodiimide crosslinkers, and a combination thereof; and
   (ii) the aqueous precursor liquid optionally comprises a catalyst selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

12. The method of claim 9, wherein the second precursor has a cloud point of less than or equal to 100° C.

13. The method of claim 9, wherein the aqueous precursor liquid has one or more of the following:
   (i) solids present in an amount of about 0.005 wt. % to about 2 wt. % solids; and
   (ii) a pH of about 2 to about 6.

14. The method of claim 9, wherein the surface of the article comprises a material selected from the group consisting of glass, plastic, fabric, textile, yarn, leather, surface, paint, and a combination thereof.

15. The method of claim 9, wherein the method further comprises preparing the aqueous precursor liquid by:
   (i) mixing the first fluorine-containing precursor, wherein the first fluorine-containing precursor is water-borne, with the second precursor, water, the crosslinking agent, an optional catalyst, and an optional salt, and optionally adjusting the pH of the aqueous precursor liquid to about 2 to about 6;
   (ii) emulsifying a solvent-borne fluorine-containing precursor with water and an emulsifier component to form the aqueous precursor liquid comprising the first fluorine-containing precursor and mixing the aqueous precursor liquid with the second precursor, water, the crosslinking agent, an optional catalyst, and an optional salt, and optionally adjusting the pH of the aqueous precursor liquid to about 2 to about 6; or
   (iii) reacting the first fluorine-containing precursor, wherein the first fluorine-containing precursor is water-borne, with a hydrophilic moiety, an ionic moiety, or a combination thereof to form a fluoropolymer and mixing the fluoropolymer with the second precursor, water, the crosslinking agent, an optional catalyst, an optional salt, and optionally adjusting the pH of the aqueous precursor liquid to about 2 to about 6.

16. The method of claim 9, wherein the applying of the aqueous precursor liquid to the surface of the article comprises flowing the aqueous precursor liquid onto and/or into the article in a flow reactor, and optionally heating the aqueous precursor liquid, the article, or a combination thereof to a temperature greater than a cloud point of the second precursor.

17. A heterophasic thermoset polymeric coating comprising:
   a first phase comprising a first fluorine-containing polymer component formed from at least a first fluorine-containing precursor having a functionality of greater than 2; and
   a second phase comprising a second component formed from a second precursor, wherein the second component is substantially immiscible with the first fluorine-containing polymer component, and at least a portion of the second component in the second phase is bonded together with a moiety selected from the group consisting of a nitrogen-containing moiety, an oxygen-containing moiety, an isocyanate-containing moiety, and a combination thereof, wherein the heterophasic thermoset polymeric coating is formed from an aqueous precursor comprising water, the first fluorine-containing precursor, and the second precursor;
   wherein when the second phase is a continuous phase, the first phase is a discrete phase within the continuous phase, wherein the discrete phase comprises a plurality of first domains each having an average size of greater than or equal to about 500 nm to less than or equal to about 25,000 nm; or
   wherein when the first phase is the continuous phase, the second phase is the discrete phase within the continuous phase, wherein the discrete phase comprises a plurality of second domains each having an average size of greater than or equal to about 500 nm to less than or equal to about 25,000 nm.

18. The heterophasic thermoset polymeric coating of claim 17, wherein the at least one fluorine-containing precursor comprises a polyol fluoroacrylate or a polyol copolymer of polyvinylidene difluoride.

19. The heterophasic thermoset polymeric coating of claim 17, wherein:
   (i) the fluorine-containing polymer component comprises a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof; and
   (ii) the second component is selected from the group consisting of a hygroscopic polymer, a hydrophobic polymer that is not lipophobic, an ionic hydrophilic precursor, an amphiphilic polymer, a fluorosurfactant, and a combination thereof, wherein:
      (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;
      (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;
      (c) the ionic hydrophilic precursor comprises a pendant carboxylate group, an amine group, a sulfate group, a phosphate group, optionally fluorine, and a combination thereof; and
      (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)—polylactic acid (PLA) diblock polymer, polyethylene glycol (PEG)—poly(lacticco-glycolic acid) (PLGA) diblock polymer, polyethylene glycol (PEG)—polycaprolactone (PCL) diblock polymer, polyethylene glycol (PEG)—polyethylene (PE) diblock polymer, and polyethylene glycol (PEG)—polystyrene (PS) diblock polymer, and a combination thereof; and (e) the fluorosurfactant comprises a fluorinated acid moiety and one or more functional group, wherein the fluorinated acid is selected from the group consisting of perfluorohexanoic acid, perfluorobutanesulfonic acid, perfluorobutane sulfonate, and a combination thereof; and wherein the functional group is selected from the group consisting of a hydroxyl group, an amine group, an isocyanate group, and a combination thereof.

20. The heterophasic thermoset polymeric coating of claim 17, wherein the plurality of first domains each have an average size of greater than or equal to about 15,000 nm to less than or equal to about 25,000 nm and/or the plurality of second domains each have an average size of greater than or equal to about 15,000 nm to less than or equal to about 25,000 nm.

* * * * *